United States Patent [19]

Wegner

[11] Patent Number: 5,055,201

[45] Date of Patent: Oct. 8, 1991

[54] PROCESS FOR REMOVING DISSOLVED CONTAMINANTS FROM AQUEOUS SOLUTIONS USING REVERSIBLY DISPERSIBLE GETTERS

[75] Inventor: Paul C. Wegner, San Carlos, Calif.

[73] Assignee: Tiegel Manufacturing Company, Belmont, Calif.

[21] Appl. No.: 389,375

[22] Filed: Aug. 4, 1989

[51] Int. Cl.$^5$ .............................................. C02F 1/56
[52] U.S. Cl. ................................... 210/727; 210/638; 210/729; 210/734; 210/908; 210/909; 210/912
[58] Field of Search ............... 210/634, 643, 725, 727, 210/728, 729, 912, 638, 734, 908, 909

[56] References Cited

U.S. PATENT DOCUMENTS

| | | | |
|---|---|---|---|
| 3,158,570 | 11/1964 | Duke | 210/912 |
| 3,203,968 | 8/1965 | Sebba | 210/904 |
| 3,238,127 | 3/1966 | Sebba | 210/704 |
| 3,755,158 | 8/1973 | Inazuka et al. | 210/725 |
| 4,631,132 | 12/1986 | Jones | 210/727 |
| 4,731,187 | 3/1988 | Moriya et al. | 210/725 |

FOREIGN PATENT DOCUMENTS

| | | | |
|---|---|---|---|
| 53-4354 | 1/1978 | Japan | 210/912 |
| 56-7683 | 1/1981 | Japan | 210/727 |

*Primary Examiner*—Peter Hruskoci
*Attorney, Agent, or Firm*—Frank J. Benasutti

[57] ABSTRACT

A process for purifying contaminated aqueous solutions without using ion exchange resins or organic solvents is provided. The process comprises contacting an aqueous solution with a non-polymeric getter compound in a dispersed state to remove dissolved contaminants or recover dissolved valuable materials. Suitable getter compounds having pendant long chain hydrocarbon radicals and complexing moieties are disclosed. The process is highly efficient and effective for removing a wide variety of dissolved contaminants such as metal ions, non-metal ions and dissolved organic contaminants such as dyes.

10 Claims, No Drawings

PROCESS FOR REMOVING DISSOLVED CONTAMINANTS FROM AQUEOUS SOLUTIONS USING REVERSIBLY DISPERSIBLE GETTERS

FIELD OF THE INVENTION

The present invention relates to a process for removing contaminants or recovering valuable materials from aqueous solutions. More particularly, it relates to the efficient and effective removal of dissolved contaminants such as toxic metal ions from wastewater by utilizing reversibly dispersible getters.

BACKGROUND OF THE INVENTION

A significant problem in the chemical industry is the treatment of wastewater and other process streams to remove pollutants to environmentally acceptable levels. Millions of gallons of wastewater contaminated with heavy metals and other pollutants are generated each day which must be treated to reduce the amount of pollutants to very low levels. For example, particularly toxic pollutants such as lead and mercury must be reduced to 50 ppb and 2 ppb, respectively. As an indication of the levels desired to be achieved, the following Table I sets forth a list of "priority" pollutants established under the Clean Water Act and the current federal drinking water and maximum allowable river discharge limits.

TABLE I

| EPA Priority Pollutant Elements | Maximum Allowable Concentrations (ppm) |
| --- | --- |
| Antimony | 0.15 |
| Arsenic | 0.05 |
| Beryllium | 0.000037 |
| Cadmium | 0.01 |
| Chromium | 0.05 |
| Copper | 1.0 |
| Lead | 0.05 |
| Mercury | 0.002 |
| Nickel | 0.013 |
| Selenium | 0.01 |
| Silver | 0.05 |
| Thallium | 0.013 |
| Zinc | 5.0 |

The need to remove pollutants from large volumes of wastewater to these very low levels has pushed currently available technologies to their limits. Aside from the ability to achieve low levels of contamination, a number of other features are desired in a process for treating wastewater. It is important to be able to treat polluted water in a cost effective manner. In addition to cost effective operation of the process, it is desirable to minimize any required changes to existing water pollution equipment. It is also desirable to reduce the size of a treatment plant as much as possible by increasing the processing rate. In some cases, it is desirable to use a recyclable material to remove the pollutants, so long as the regeneration process does not create more pollution than it eliminates. A wastewater treatment process should create as little solid waste as possible. Finally, the process should not create additional pollution problems such as polluting the treated water with other environmental pollutants.

One of the most popular technologies for treating wastewater is based on a settling process using lime. Calcium hydroxide or magnesium hydroxide is added to the water in a settling tank to absorb the offending contaminant. This technology permits the processing of large volumes without adding polluting chemicals and uses very simple equipment. However, in many cases, the contaminant concentration cannot be reduced low enough to meet EPA standards without using excessive amounts of material and long processing times. Additionally, large amounts of solid hazardous waste in the form of sludge are produced which cannot be effectively regenerated. While landfill has been the most popular means of disposing of the sludge, it is rapidly becoming an unacceptable method of handling hazardous waste. Thus, using this technology, the contaminated wastewater problem is essentially being replaced by a solid hazardous waste disposal problem.

Another popular method of cleaning contaminated wastewater is the use of ion exchange resins to filter out the contaminants. Generally speaking, the advantages of ion exchange resins are that it is regenerable, it does not pollute the treated water and usually no separation process is required to remove the ion exchange resin from the treated water. However, the use of ion exchange resins to treat wastewater has a number of disadvantages.

Ion exchange resin processes are slow, very expensive and have low efficiencies. In order to be effective, the wastewater must be passed through a significant amount of resin, usually in the form of a filter bed. This is acceptable for treating small volumes of water to achieve certain levels of purity (e.g., 0.1 ppm of lead). However, as the desired level of purity (e.g. 0.05 ppm of lead) and volume of water increase, this technology becomes increasingly slow or less effective. The complex fabrication process and sophisticated synthetic chemistry involved in developing and producing ion exchange resins significantly contributes to the expense of using ion exchange resins to purify liquid waste and limits the variety of resins available. Ion exchange resin beds may be regenerated, but the wastewater from the regeneration must be treated to remove bulk toxins and then usually passed through the ion exchange resin again to eliminate all the polluted water.

Another technology for removing water soluble material is solvent extraction. This technology is not used in the waste water treatment industry, but rather for reclaiming materials of value such as in the mining industry. In solvent extraction processes, an organic solvent such as kerosene is contacted with the water containing the material to be reclaimed. The organic solvent contains an extractant compound which is preferably highly soluble in the organic phase and significantly less soluble in the aqueous phase. The extractant compound complexes with the material to be removed and the complexed extractant-material remains dissolved in the solvent. The organic and aqueous phases are then separated such as by decanting. The primary advantages of solvent extraction are speed, effectiveness, and ease of regeneration. The extractant compounds are also generally easier to synthesize than ion exchange resins. Therefore, a much broader variety of materials is commercially available and extractants may be tailored to selectively extract particular materials. However, solvent extraction does have disadvantages that make this technology unsuitable for the purification of wastewater.

One major disadvantage is that solvent extraction leaves solvent and extractant residues in the processed water thus creating another pollution problem. The solvents and in some cases the extractants are environmentally toxic. The solvents are generally flammable and toxic which creates an environmental hazard. They may also be expensive thereby contributing to the expense of the process. If regeneration cannot be used, it takes a large volume of solvent to treat a given volume of water and solvent extraction may be prohibitively expensive. While the solvents are easier to regenerate than ion exchange resin and yield a much smaller volume of regeneration waste, the wastes still must be treated, creating yet another pollution problem.

The process of the present invention has the advantages of the above technologies with few disadvantages and is also highly efficient and effective for purifying aqueous solutions. The same equipment that is commonly found in most large scale water and municipal water treatment plants (i.e., settling process equipment) may be used to practice the present process. For a given volume of wastewater, the processing time is generally much less than for ion exchange resins or settling and comparable with processing time for solvent extractions. However, unlike solvent extraction, potentially toxic and flammable solvents are not introduced into the water. Compared to lime settling treatment, very little sludge is produced, yet low contaminant concentrations that meet EPA regulations may be achieved. The getters used in the present process may be regenerated easily with inexpensive chemicals without producing excessive r®generation wastewater. Because relatively small amounts of sludge are generated and the getters are not usually expensive compounds, the wastes may optionally be disposed of by landfill or incineration.

SUMMARY OF THE INVENTION

The present invention provides a process for removing a dissolved contaminant from an aqueous solution comprising: contacting the aqueous solution with a non-polymeric, reversibly dispersible getter in a dispersed state to form a getter-contaminant material; removing the getter-contaminant material by reducing the dispersibility of the getter-contaminant material to form a discontinuous phase containing the getter-contaminant material and separating the discontinuous phase from the aqueous solution.

A process for purifying contaminated aqueous solutions without using ion exchange resins or organic solvents is provided. The process comprises contacting an aqueous solution with a non-polymeric getter compound in a dispersed state to remove dissolved contaminants or recover dissolved valuable materials. Suitable getter compounds having pendant long chain hydrocarbon radicals and complexing moieties are disclosed. The process is highly efficient and effective for removing a wide variety of dissolved contaminants such as metal ions, non-metal ions and dissolved organic contaminants such as dyes.

DETAILED DESCRIPTION OF THE INVENTION

According to the process of the present invention, a reversibly dispersible getter is contacted with a contaminated aqueous solution in a dispersed state. The getter and dissolved contaminant form a getter-contaminant material which is believed to be in the form of a complex. The getter-contaminant material is then removed by reducing its dispersibility in the aqueous solution to form a discontinuous, preferably solid, phase which may be separated from the aqueous solution.

The process of the present invention is useful to remove a wide variety of dissolved contaminants such as aluminum, antimony, arsenic, beryllium, boron, cadium, cesium, chromimum, cobalt, copper, iron, lead, mercury, nickel, plutonium, selenium, silver, thallium, uranium, vanadium, zinc, and the like and dissolved organic contaminants such as polychlorinated biphenyls (PCBs), trichlorethylene, DDT, fluoroscene, trihalomethanes, trihalomethane precursors, dyestuffs such as methylene blue and the like. The process may also be used to recover dissolved valuable metal, non-metal and organic ions.

A "reversibly dispersible getter" is a non-polymeric compound which is substantially insoluble in water having at least one pendant hydrophobic moiety and at least one hydrophilic complexing moiety. The pendant hydrophobic moiety is preferably a straight chain ($C_{14}$–$C_{32}$, more preferably $C_{18}$–$C_{32}$) n-alkyl group and most preferably a n-stearyl group. When more than one pendant hydrophobic moiety is present, the total number of carbon atoms on these moieties should be preferably 16 or greater. Thus, two pendant $C_{10}$ straight chain radicals will generally impart sufficient hydrophobicity to the getter compound. The hydrophilic complexing moiety is preferably an ion having an affinity for the dissolved ion desired to be removed from the aqueous solution. Suitable complexing moieties are phosphate, pyrophosphate, phosphinate, phosphonate, dithiophosphate, dithiophosphinate, carbamate, dithiocarbamate, amine, sulfonate, sulfide, cysteine moieties and the like.

Suitable reversibly dispersible getters are, for example, stearyl phosphate, distearyl phosphate, stearyl amine, distearyl amine, tristearyl amine, distearyl methyl amine, distearyl ethyl amine, hydrogenated tritallow amine, stearyl dimethyl benzyl amine, distearylamine monoacetic acid, stearylamine diacetic acid, stearyl mercaptan, distearyl dithiophosphinate, distearyl dithiophosphate, stearyl carbamate, distearyl dithiocarbamate, distearyl ethyl diamine, N-stearyl pyridine, stearyl xanthates, sulfurized beeswax, stearyl resorcinol, stearyl glyceride, stearic acid or mixtures thereof and the like. The selection of a getter compound will depend upon the affinity of the hydrophilic moiety for the contaminant ion desired to be removed from the aqueous solution and the countervailing or competing affinity for other ions dissolved in the solution.

A suitable getter must be sufficiently water insoluble so that excessive amounts of the getter compound do not dissolve in the aqueous solution. However, the getter must also be dispersible on an essentially molecular level in water so that it may be placed in a dispersed state. It has been found that while polymers having complexing moieties such as ion exchange resins are highly water insoluble, they are not readily dispersible because of their high molecular weight. In contrast, the getter compounds used in the present process are both substantially water insoluble and dispersible. These getter compounds are generally not useful in solvent extraction, because they have poor solubility ($<2\%$ by weight) in typical hydrocarbon solvents.

While not being bound by any particular theory, it is believed that the pendant long chain hydrocarbon radicals such as stearyl radicals impart high water insolubility to the getters while permitting the getters to be highly dispersed in water. Thus, these getter compounds are dispersible on an essentially molecular level. The getters may be analogized to "molecular ion exchange particles" which comprise a "soap-like tail"

covalently bonded directly to the complexing moiety or to a linking group which is bonded to a complexing moiety. The small, i.e. molecular, dispersed particles have a consequent high active surface area when compared to ion exchange resins. This property results in extremely high efficiency of the present process when compared to processes using ion exchange resins.

Table II below summarizes the efficiency, effectiveness, and speed that the various technologies have in treating the same volume of water.

$K_g$ is a measure of the relative efficiency of various processing materials. It assumes a linear relation between the amount of material used and the amount of metal taken out. The larger the $K_g$ is, the more water a given amount of getter can treat and still remove the contaminant to a certain level.

$$K_g = \frac{[\text{Weight of metal removed}]}{[\text{Weight of material used}] \times [\text{Weight of metal remaining}]} \times 100,000$$

A large $K_g$ indicates high efficiency. Getters which impart a $K_g$ of 20,000 or greater to the process of the present invention are preferred.

$K_{gs}$ is a measure of the relative amount of water that can be processed in the same amount of time assuming a given $K_g$ efficiency:

$K_{gs} = K_g$/process time in minutes

A large $K_{gs}$ indicates fast and efficient processes.

Processes having a $K_g$ of 20,000 and a $K_{gs}$ of 500 or greater are preferred in the present invention.

Because of its high surface area in the dispersed state, the getter readily complexes with the contaminant. The amount of getter used in the process will depend upon factors such as the concentration of the contaminant in the aqueous solution, the desired reduction in contaminant concentration sought, and volume of the aqueous solution being treated. However, it is generally preferred to use an excess of the desired molar reduction of contaminant.

After the contaminated aqueous solution has been contacted with a getter in a dispersed state to form a getter-contaminant material, typically a getter-contaminant complex, the getter-contaminant material may be removed. In contrast to solvent extraction where the getter-contaminant is isolated in a continuous organic solvent phase, the present process comprises forming a discontinuous, usually solid, phase of coalesced particles by simply reducing the dispersibility of getter-contaminant material The dispersibility is reduced by reducing the ionizability of the hydrophilic moiety or "polar head" of the getter by the introduction of an activator or other means of activating by pushing the ionized versus unionized equilibrium towards the unionized state. An activator may be selected with reference to the solubility product ($K_{sp}$) of the getter in association with the activator. One advantage of this mechanism and process is that the getter-contaminant material and residual getter are both made less dispersible. While not wishing to be limited, five basic techniques will be discussed:

(1) Adjusting the pH of the aqueous solution This will depend largely upon the particular getter used in the

TABLE II

RELATIVE PERFORMANCE OF VARIOUS TREATMENTS FOR PROCESSING ONE LITER OF WATER

| MATL TYPE | TYPE OF REAGENT | AMOUNT OF MATERIAL REAGENT USED | WEIGHT OF METAL IN WATER INITIAL | WEIGHT OF METAL IN WATER FINAL | TREATMENT TIME | RELATIVE EFFICIENCY $K_g$ | RELATIVE SPEED EQUAL EFFICIENCY $K_{gs}$ |
|---|---|---|---|---|---|---|---|
| Pb | Ion Exchange DP-1* | 1,000 mg | 50 mg | 0.05 mg | 660 min | 9,100 | 14 |
| Dye | Ion Exchange DP-1* | 20,000 mg | 2 mg | 0.20 mg | 1 min | 5 | 5 |
| Pb | Magnesium Hydroxide | 1,000 mg | 10 mg | 0.05 mg | 100 min | 20,000 | 200 |
| Cd | Solvent Extraction● | 401,000 mg | 36 mg | 1.6 mg | 3 min | 5.6 | 1.9 |
| Pb | Getter⁰ Example A | 150 mg | 10 mg | .005 mg | 30 min | 1,300,000 | 44,000 |
| Dye | Getter⁰ Example B | 200 mg | 20 mg | 0.20 mg | 0.5 min | 50,000 | 100,000 |

*Amberlite DP-1 ion exchange resin available from Rohm and Haas Company, Philadelphia, Pennsylvania.
●Includes weight of solvent.
⁰Includes weight of salt used in process.

In the present process, a getter compound must be placed in a dispersed state. This may be achieved by dispersing the getter directly in the contaminated aqueous solution or by predispersing the getter in a stock aqueous dispersion which is subsequently contacted with the contaminated aqueous solution. A stock dispersion may be prepared using known dispersing techniques such as using dispersing agents, heating the water (preferably above the kraft point of the getter) or adjusting the pH of the water. The particular method of placing the getter in a dispersed state will largely depend upon the pH, temperature, and ion composition of the contaminated aqueous solution. For example, in treating an acidic contaminated aqueous solution, it is generally preferred to prepare a stock dispersion which is subsequently mixed into the aqueous solution with agitation.

process. For example, stearyl phosphate may be made less dispersible by the addition of an acid such as nitric acid and stearyl amine may be made less dispersible by the addition of sodium hydroxide.

(2) Adding divalent or polyvalent metal ions to the aqueous solution. For example, stearyl phosphate may be made less dispersible by the addition of magnesium sulfate to the aqueous solution.

(3) Forming a non-ionizable (water insoluble) salt in the aqueous solution. In the case of stearyl phosphate, this may be achieved by the addition of silver nitrate.

(4) Adding a salt to reduce dispersibility by the common ion effect. Thus sodium sulfate, potassium sulfate or sodium phosphate may be added to reduce the dispersibility of stearyl phosphate.

(5) Changing the temperature of the aqueous solution. Generally, lowering the temperature decreases dispersibility.

Where an acid, salt or base is added to the aqueous solution to reduce the dispersibility of the getter-contaminant material, it has been found that the effectiveness of the process may also be affected. Therefore, it is desirable to use acids, salts or bases which are "non-competitive" with the getter-contaminant complex, i.e., do not compete with the contaminant ion to complex with the getter. It is preferred that the added acid, salt or base tends to promote the complexing of the ionized contaminant with residual uncomplexed getter. For example, the addition of magnesium sulfate to a lead-contaminated aqueous solution being treated with stearyl phosphate promotes the complexing of the lead with the stearyl phosphate (thus increasing the effectiveness of the process) and reduces the dispersibility of the stearyl phosphate-lead complex. In contrast, iron sulfate is slightly competitive, and adding large amounts of sulfuric acid (adjusting pH to 1) is extremely competitive. While these salts and acids reduce the dispersibility, they also tend to reduce the effectiveness of the process in this particular example.

In some instances, the addition of an acid, salt or base to reduce dispersibility will not be necessary, since the contaminated aqueous solution may contain, in addition to the contaminant, an acid, salt or base which tends to reduce the dispersibility of the getter-contaminant material. In treating such contaminated aqueous solutions, it is desirable to first prepare a stock aqueous dispersion of the getter which is subsequently mixed with the contaminated solution.

The getter-contaminant material in the discontinuous phase may be separated from the aqueous solution using known techniques such as filtering, flocking and/or settling. The getter may be regenerated using techniques generally known for regenerating contaminant loaded extractants in solvent extraction processing.

The examples set forth in Table III below are illustrative of the process of the present invention. In the examples, the following general procedure was used to treat 1 liter of contaminated aqueous solution. Getter or getter salt is predispersed in water, usually hot water. It is then added to the contaminated water and is stirred for 15-30 minutes. The activator for reducing dispersibility and about 1 mg of flocking agent are then added together to the aqueous solution and stirred for an additional 30 minutes. The getter-contaminant material is then allowed to settle and/or is filtered from the aqueous solution.

TABLE III

| | Metal/Toxin | Initial In ppm | Final In ppb | Getter | Amount In grams | Activator | Amount In grams | Flocking Agent Polyacrylamide | Settling Agent Diatomecry earth | Comments |
|---|---|---|---|---|---|---|---|---|---|---|
| 1. | Lead | 10 | 369 | | | Magnesium sulfate | 0.1 | X | | Control |
| 2. | Lead | 10 | 160 | Stearyl phosphate | .05 | Magnesium sulfate | 0.1 | X | X | Settling agent contaminated with Fe ion |
| 3. | Lead | 10 | 1 | Stearyl phosphate | .05 | Magnesium sulfate | 1.0 | X | | |
| 4. | Lead | 10 | <1 | Stearyl phosphate | .05 | Magnesium sulfate | 0.1 | X | | Treated twice |
| 5. | Lead | 10 | 104 | Stearyl phosphate | .05 | Sodium sulfate | 0.1 | X | | |
| 6. | Lead | 10 | 2,200 | Stearyl phosphate | .05 | Sulfuric acid | 0.1 | X | | |
| 7. | Lead | 10 | 186 | Stearylamine | .05 | Magnesium sulfate | 0.1 | X | | |
| 8. | Lead | 10 | 61 | Stearylamine-diacetic acid | .05 | Magnesium sulfate | 0.1 | X | | |
| 9. | Lead | 10 | 24 | Distearyl phosphate | .05 | Magnesium sulfate | 0.1 | X | | |
| 10. | Lead | 10 | 150 | Stearyl phosphate | .025 | Magnesium Oxide | 0.03 | X | | high pH = 9 |
| 11. | Cadmium | 10 | 1,240 | Stearyl phosphate | .05 | Magnesium sulfate | 0.1 | X | | |
| 12. | Antimony | 10 | 660 | Stearyl phosphate | .05 | Magnesium sulfate | 0.1 | X | | |
| 13. | Methylene Blue | 20 | 200 | Stearic acid | .1 | Sulfuric acid | pH = 3 | X | | Add until solution is 100% purple |
| 14. | Iron | 60 | 5,000 | Stearyl phosphate | .6 | Sulfuric Acid | 125 | X | | |

What is claimed is:

1. A process for removing a dissolved contaminant from an aqueous solution comprising:

contacting said aqueous solution with a non-polymeric, substantially water-insoluble, reversibly dispersible getter compound having at least one covalently bonded pendant n-alkyl radical of 18 to 32 carbon atoms and at least one hydrophilic, ion complexing moiety in a dispersed state to form a getter-contaminant material;

adding an effective amount of an activator selected from the group consisting of sulfuric acid, magnesium sulfate, sodium sulfate, potassium sulfate, nitric acid, sodium hydroxide, silver nitrate and sodium phosphate to said aqueous solution to reduce the dispersibility of said getter-contaminant material;

separating said getter-contaminant material from said aqueous solution by filtering or settling.

2. A process according to claim 1, wherein the compound has at least one convalently bonded pendant stearyl radical.

3. A process according to claim 1, wherein the compound has at least one hydrophilic moiety selected from the group consisting of phosphate, pyrophosphate, phosphinate, phosphonate, dithiophosphate, dithiophosphinate, carbamate, dithiocarbamate, amine, sulfonate, sulfide and cysteine.

4. A process according to claim 1, wherein the compound is selected from the group consisting of stearyl phosphate, distearyl phosphate, stearyl amine, distearyl amine, tristearyl amine, distearyl methyl amine, distearyl ethyl amine, hydrogenated tritallow amine, stearyl dimethyl benzyl amine, distearylamine monoacetic acid, stearylamine diacetic acid, stearyl mercaptan, distearyl dithiophosphinate, distearyldithiophosphate, stearyl carbamate, distearyl dithiocarbamate, distearyl ethyl diamine, N-stearyl pyridine, stearyl xanthate, sulfurized beeswax, stearyl resorcinol, stearyl glyceride, stearic acid and mixtures thereof.

5. A process according to claim 1, wherein the compound is selected from the group consisting of stearyl phosphate, stearyl amine, stearic acid, distearyl dithiophosphinate, distearyl dithiocarbamate and stearyl amine diacetic acid.

6. A process according to claim 1, wherein the compound is placed in a dispersed state by dispersing the compound in a stock aqueous dispersion.

7. A process according to claim 6, wherein the compound is contacted with the aqueous solution by mixing the stock aqueous dispersion with the aqueous solution.

8. A process according to claim 7, wherein the compound is selected from the group consisting of stearyl phosphate, stearyl amine, stearic acid, distearyl dithiophosphinate, distearyl dithiocarbamate and stearyl amine diacetic acid.

9. A process according to claim 1 wherein a flocking agent is added to further reduce the dispersibility of said getter-contaminant material.

10. A process according to claim 9 wherein said flocking agent is a polyacrylamide flocking agent.

* * * * *

UNITED STATES PATENT AND TRADEMARK OFFICE
CERTIFICATE OF CORRECTION

PATENT NO. : 5,055,201

DATED : October 8, 1991

INVENTOR(S) : Paul C. Wegner

It is certified that error appears in the above-identified patent and that said Letters Patent is hereby corrected as shown below:

Col. 8, line 1, claim 2    delete "convalently" and insert --covalently-- ;

Col. 8 & 10, line 1, claim 8 --getter-- before "compound" in every instance.

Signed and Sealed this

Thirtieth Day of March, 1993

*Attest:*

STEPHEN G. KUNIN

*Attesting Officer*    *Acting Commissioner of Patents and Trademarks*